Patented Sept. 27, 1932

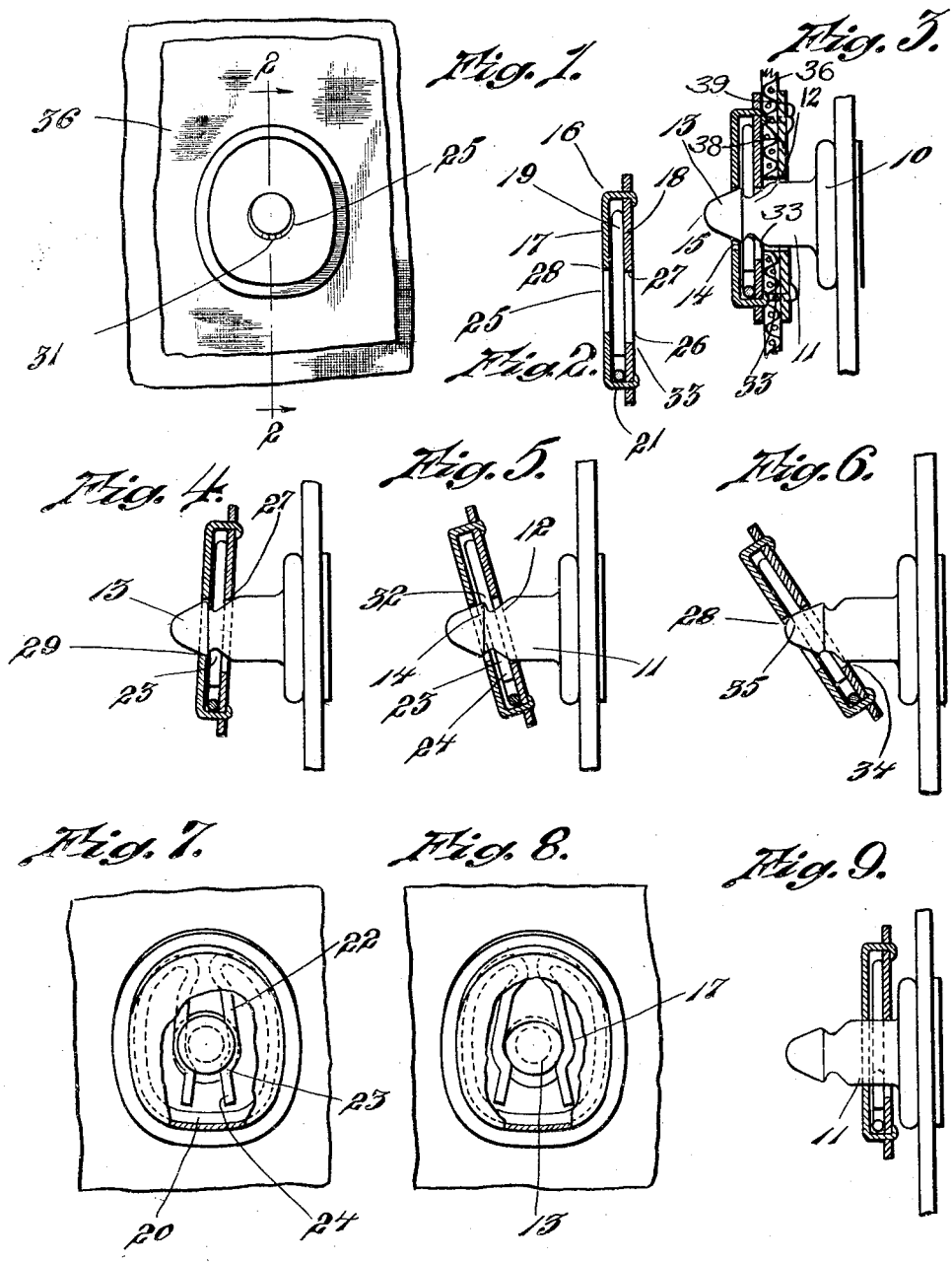

1,879,100

UNITED STATES PATENT OFFICE

ALLAN B. COLBY, OF PROVIDENCE, RHODE ISLAND

FASTENER

Application filed May 31, 1930. Serial No. 458,555.

This invention relates to a fastener more particularly that type having a three-point engagement with a stud, whereby separation of the stud and socket may be effected by a tipping movement in one predetermined general direction only.

An object of this invention is to provide a socket member of the fastener with a relatively small opening in the top plate, and so position the openings in the top plate and bottom plate that disengagement may be effected with ease by a tipping movement in one direction, due to the relative proportions and arrangement of the cooperating parts, while at the same time preventing disengagement of the socket from the stud by a relative tipping movement in other directions.

A further object of the invention is to so position the openings in the front plate and back plate that the edge of the opening in the back plate will engage the stud and so cooperate with the edge of the opening in the front plate of the socket as to cause a binding of the parts upon a tendency towards separation in one direction, but permit separation in the opposite direction.

With these and other objects and advantageous features in view, the invention consists of a novel arrangement of parts more fully disclosed in the detailed description following, in conjunction with the accompanying drawing, and more particularly set forth in the appended claims.

In the drawing:

Fig. 1 is a top plan view of the stud and socket members in engagement, both mounted upon portions to be secured together;

Fig. 2 is a section of the socket member on line 2—2 of Figure 1;

Fig. 3 is a section of the socket member in engagement with the stud, and showing the socket member as mounted on a piece of fabric or the like;

Fig. 4 is a section of the socket member tipped and prevented from disengagement with the stud;

Fig. 5 is a section of the socket member showing the same tipped about the stud in the releasable direction;

Fig. 6 is a view similar to Figure 5 showing the socket tipped further relative to the stud and in the position for disengagement therefrom;

Fig. 7 is a plan view partially broken away showing the spring jaws in the position that they assume when the stud and socket are in the positions shown in Figure 5;

Fig. 8 is a view similar to Figure 7 showing the spring jaws in position for disengaging the stud and in the position which they assume in Figure 6;

Fig. 9 is a sectional view of the socket as forced on to the stud beyond the reduced neck portion thereof.

In fasteners for use in connection with automobile curtains and the like, it is desirable to provide a fastener, the socket member of which may be detached from its stud by a relative tipping action in one direction only, and in order to accomplish this result, it has been usual to provide obstructions such as an additional part to cooperate with the spring jaws and in the plane therewith to engage beneath the head of the stud to prevent tipping in the opposite direction, or to provide a lip about the edge of the opening in the rear plate to engage the stud and prevent tipping in this direction. Both of these constructions require additional material and additional labor to form the same; and in order to eliminate this additional material and forming operations, I have located the holes or openings in the front and back plates in such position one relative to the other that the edge of the back opening will engage the tapered portion of the neck of the stud and cooperate with the edge of the opening in the front plate to prevent tipping of the socket relative to the stud in one direction, while the openings are of such size, the opening in the back plate being elongated, that a tipping in the other direction will permit the socket to be swung clear of the stud by the end of the stud just clearing the edge of the openings of the socket with which it might otherwise contact, and by staggering these openings in this manner, I may provide the opening in the top plate smaller in diameter than has heretofore been found practical, thereby providing a fastener better in appearance and one having the appearance of more accurate workmanship than has heretofore been the case; and the following is a detailed description of the present embodiment of this invention, illustrating the preferred means by which these advantageous results may be accomplished.

With reference to the drawing, 10 designates the stud provided with a shank 11, reduced neck 12 and head 13 with the shoulder 14 formed between the neck 12 and the head 13. The neck 12 and head 13 are both tapered as illustrated, with the end of the stud rounded as at 15 to facilitate entrance of the stud into the socket member.

The socket member generally designated 16 consists of a front plate 17 and a back or bottom plate 18 with a spring 19 positioned between the plates and consisting of a wire 20 following about the side walls 21 of the socket and bent to form substantially parallel stud engaging jaws 22 bent toward each other to form a shoulder 23 and having the end portions 24 thereof engaging for a substantial distance to keep the parallel jaws 22 a sufficient distance apart to allow the stud portion to enter easily. The plate 17 is provided with an opening 25 generally circular in shape, and the back plate 18 is provided with an opening 26 which is of elliptical shape having a width substantially the diameter of the opening 25 and of a length considerably longer than the opening 25 and extending therebeyond. The edge 27 of the opening 26 is at a point the distance from or closer to the axis of the stud than is the edge 28 of the opening 25, whereby these openings may be staggered.

The opening 25 is of a size substantially the diameter of the stud 11 and of a size slightly larger than the diameter of the head 13, and the openings 25 and 26 are so positioned that a relative tipping movement of the stud and socket, as shown in Figure 4, causes the edge 27 of the opening in the back plate to engage the tapered portion of the neck of the stud, while the edge 29 of the opening in the front plate engages the head of the stud and prevents disengagement of the stud and socket by a tilting movement in this direction. However, a tilting movement in the opposite direction causes the portions 24 of the jaws to slide along the tapered neck 12 and spread the shoulder portions 23 and at the same time the portions 32 of the jaws engage the slightly rounded shoulder 14 of the head, both cooperating to cause the jaws to spread apart, as illustrated in Figure 7, and the openings are so positioned and of such a size as to permit a continued tipping movement in this direction with a consequent withdrawal of the socket from the stud by this continued tipping movement and a sliding action of the socket axially along the stud. The edge 33 of the opening 26 in the back plate contacts at a point 34 on the shank of the stud in the tipping of the socket and due to the sliding of that point along the shank to the beginning of the neck, and as the relation of the openings in the socket are such that the distance from the edge 33 to the edge 28 of the opening 25 is greater than the distance from the point of contact to the point 35 of the stud nearest to this edge 28, thereby permitting the removal of the socket from the stud by the continued tipping movement mentioned.

In some instances, the socket may be forced on to the shank 13 of the stud, as illustrated in Figure 9, to permit an additional socket to be positioned on the stud, as desired. Also, spurs 39 may be formed on the socket member for piercing and clamping the same to a piece of fabric 36 in a usual manner, by extending over a securing plate 38, see Fig. 3, although the manner of securing forms no particular part of this invention and is omitted from all but Fig. 3 of the drawing.

It will be apparent from the above that the socket may be removed from the stud by a tilting in one direction but that tilting in the opposite direction will prevent any disengagement. Also as the jaws extend along opposite sides beneath the head, tilting for removal in directions at right angles to those illustrated are also prevented. It is of course apparent that where the stud and socket members are to be used for the curtains of an automobile, the upper portion of the socket as shown in the drawing will assume a position adjacent the edge of the curtain to be attached or detached.

While I have described certain construction forms which embody the principles of my invention, it is obvious that other desired changes in arrangement may be made within the spirit and the scope of the invention as defined in the appended claims.

I claim:

1. A fastener comprising, in combination, a stud having a head, a neck and a shank, a socket having top and bottom plates and a securing plate each having an opening therein, resilient jaws between said top and bottom plates, said openings in the top and bottom plates being staggered, whereby the edge of the opening in the bottom plate at one point extends closer to the axis of the stud than the edge of the opening in the top plate at a point in the plane with the axis of the stud and the first point, whereby a relative movement tending to tip one side of the socket toward the end of the stud is prevented by the edge of the opening in the top plate engaging the stud head and the edge of the opening in the bottom plate engaging the stud at the tapered portion of the neck, the engagement of the edge of the opening in said bottom plate with the stud being in the plane of such plate.

2. A fastener comprising, in combination, a stud having a head, a neck and a shank portion, a socket having spaced top and bottom plates with openings therein and jaws between said plates, said stud and socket cooperating during relative tipping movement of said stud and socket in one direction to cause a substantial disengagement of said jaws from said stud, and said stud and the edges of the openings in said plates being of such size and so positioned as to lock with the shank and head of the stud during a relative tilting movement of the stud and socket in the opposite direction to prevent disengagement thereof, the engagement of the edge of the opening in said bottom plate with the stud being in the plane of such plate, and a securing plate to cooperate with the socket for holding the same on a piece of fabric.

3. A fastener comprising, in combination, a stud having a head, a neck and a shank portion, a socket having spaced top and bottom plates with openings therein and jaws between said plates, said stud and socket cooperating during relative tipping movement of said stud and socket in one direction to cause a substantial disengagement of said jaws from said stud and said stud and the edges of the openings in said plates being of such size and so positioned as to engage the head of the stud and the shoulder formed between said neck and the shank during a relative tilting movement of the stud and socket in the opposite direction to prevent disengagement thereof, the engagement of the edge of the opening in said bottom plate with the stud being in the plane of such plate, and a securing plate to cooperate with the socket for holding the same on a piece of fabric.

4. A fastener comprising, in combination, a stud having a head, a tapered neck, and a shank, a socket having a top plate with a generally circular opening therein, a bottom plate with an elongated opening therein of a width substantially the diameter of the circular opening in the top plate, resilient jaws between said plates, a securing plate for cooperating with the socket to hold the same on the fabric, said stud and socket cooperating during a relative tipping movement of the stud and socket in one direction to cause said tapered neck to spread said jaws to a size to substantially disengage the head prior to engagement of the edge of the opening in the bottom plate with the shank, said opening in the bottom plate being of such a size and so positioned relative to the opening in the front plate that the distance from said point of contact to the diametrically opposite point of the opening in the top plate is greater than the distance from said point of contact to the point on said stud closest to said diametrically opposite point during tipping movement, the engagement of the edge of the opening in said bottom plate with the stud being in the plane of such plate, and a securing plate to cooperate with the socket for holding the same on a piece of fabric.

5. A fastener comprising, in combination, a stud having a head, a reduced neck and a tapered shank portion, a socket member having spaced flat top and bottom plates with openings therein, resilient jaws between said plates, said stud being receivable within said openings whereby said jaws engage said neck to lock the stud and socket member together, the opening in said top plate substantially conforming to the size of said stud head, and the opening in said bottom plate being larger than said top plate opening and having an edge portion extending inwardly toward the axis thereof beyond the corresponding edge of said top plate whereby a movement of the socket to tip one side thereof relative to the stud is prevented by the engagement of said bottom plate opening edge with the tapered shank of said stud, and means associated with said bottom plate for attachment thereof to a piece of fabric.

In testimony whereof I affix my signature.

ALLAN B. COLBY.